United States Patent Office 3,023,111
Patented Feb. 27, 1962

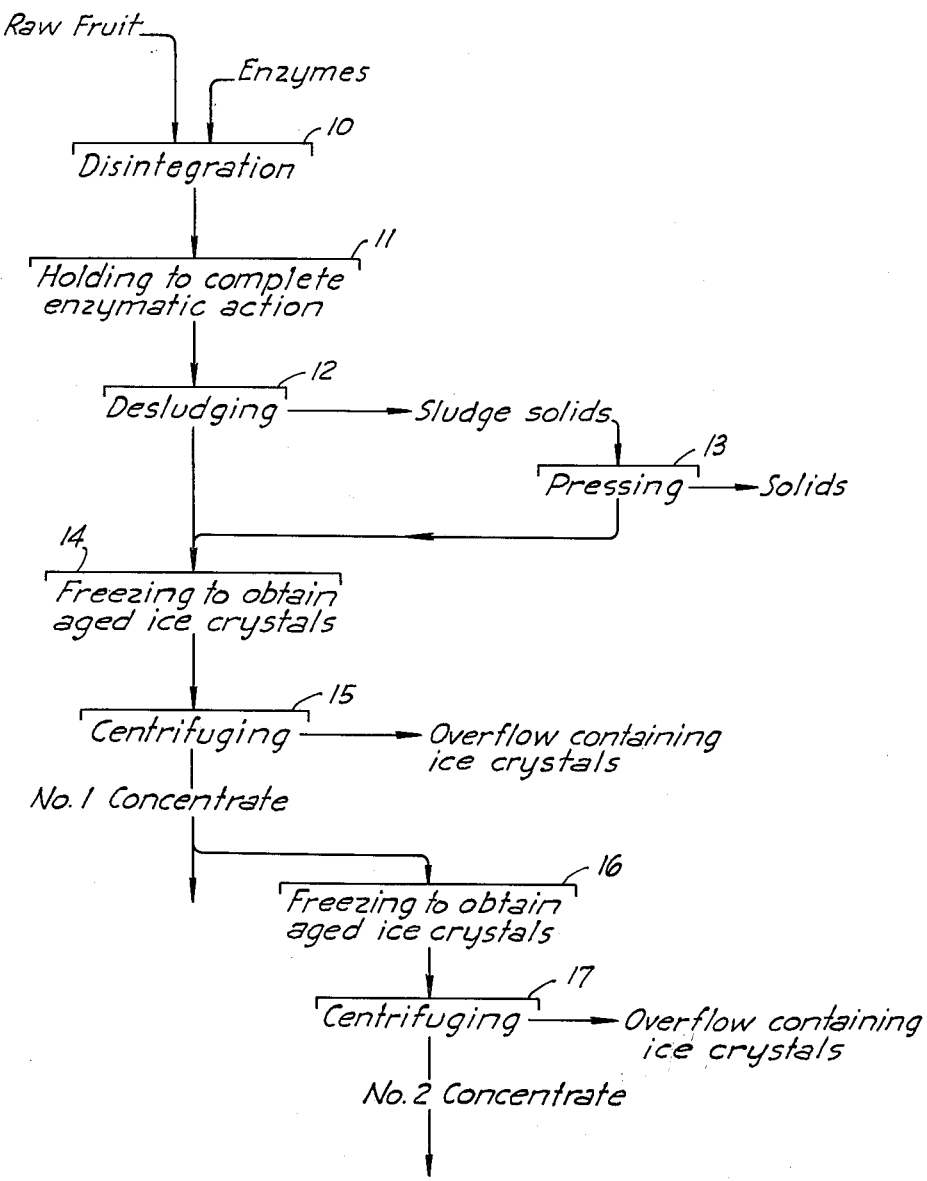

3,023,111
PROCESS FOR THE MANUFACTURE OF FRUIT
AND VEGETABLE JUICE CONCENTRATE
Earl B. Huber, 27 E. Monroe St., Chicago, Ill.
Filed Nov. 6, 1958, Ser. No. 772,240
1 Claim. (Cl. 99—205)

This invention relates generally to methods for the manufacture of liquid concentrates from raw fruits or vegetables.

At present fruit juice concentrates are prepared by pressing or otherwise mechanically extracting the juice from fresh fruit, followed by evaporation of the juice to produce the desired concentrate. During such treatment the flavor of the juice undergoes radical changes due to the time and temperature factors involved. In general the original fresh fruit flavor and odor are lost, and the concentrate takes on a cooked flavor. Also there is an impairment with respect to vitamin and other dietetic values. The use of vacuum evaporation results in some improvement although with the best vacuum evaporating equipment available, there remains a substantial impairment of flavor and freshness. This characteristic of conventional methods has restricted the commercial manufacture and sale of fruit concentrates to certain types of juices, where flavor impairment can be tolerated or where the flavor change may not be too objectionable.

In general it is an object of the present invention to provide a method for the manufacture of high quality fruit juice concentrates, and characterized in particular by flavor and freshness closely approximating the juice of the original fresh fruit.

Another object of the invention is to provide a method of the above character which can be applied to a wide variety of fruits and vegetables, including fruits and vegetables from which acceptable concentrates cannot be made by conventional methods.

Additional objects and features of the invention will appear from the following description in which the preferred embodiments have been set forth in detail in conjunction with the accompanying drawing.

The single figure of the drawing is a flow sheet illustrating a desirable procedure for carrying out the present method.

In general the present method involves the extraction of a juice from raw fresh fruit or vegetable by procedures which avoid the use of elevated temperatures, oxidation, or additions of objectionable chemical. This juice is then subjected to a special kind of freezing capable of producing a semi-frozen material containing separable aged ice crystals. This slurry is then subjected to centrifuging whereby the ice crystals are removed from the remaining concentrate. One or more additional steps of freezing and the centrifugal separation can be applied, until a concentrate is obtained having the desired solids content.

The preferred procedure illustrated in the drawing is as follows: Fresh raw fruit is supplied to the disintegrating operation 10 where it is macerated by means of a high speed disintegrator having impacting hammers. A suitable disintegrator is one of the Rietz type, such as is disclosed in Patents 2,325,426 and 2,682,374. At this point it is desirable to introduce a small amount of enzyme, such as pectinol for the purpose of breaking down the pectin content (i.e. depectinizing). In step 11 the disintegrated material is held for a period of time, such as from 4 to 8 hours, during which time enzymatic action is completed. At the end of this holding period, separable sludge solids are present.

The material is then subjected to desludging at 12, as by passing the material through a suitable desludging centrifuge. Removed sludge solids can be subjected to filtering or to pressing at 13, for the recovery of juice contained therein. In step 14 the juice is subjected to a special freezing operation which serves to develop aged ice crystals. A suitable procedure to follow is to drip or spray the juice upon a refrigerated surface, whereby it is chilled to a temperature of the order of 0° F., over a period of the order of three minutes. The material is then removed from the refrigerated surface in the form of a slurry. This slurry consists of a liquid faction together with what I have termed "aged" ice crystals. By "aged" ice crystals I have reference to crystals which are formed over a substantial time and which are of such size and separating characteristics as to permit ready separation by centrifuging. In particular I avoid the formation of large amounts of microscopic crystals, which cannot be removed by centrifuging.

The relatively heavy slurry obtained from step 14 is then subjected to centrifuging at step 15, whereby the crystals are separated from the liquid faction. The liquid faction can be referred to as the No. 1 concentrate. Assuming that a higher degree of concentration is required, this material is subjected to a second controlled freezing operation 16, carried out in the same way as operation 14, to produce a viscous slurry containing ice crystals, and this material is subjected to centrifuging at 17 to produce a No. 2 concentrate as indicated. In most instances two such operations will produce a No. 2 concentrate having a sufficiently high solids content for all practical requirements.

Use of impact disintegration in step 10, such as is produced by a high speed disintegrator of the Rietz type, is desirable in that it effectively breaks up the cell structure of the fruit, thus releasing a maximum amount of juice. Introduction of enzymes into the disintegrator operation is desirable, in that it effects thorough homogeneous distribution of the enzymes. The enzymatic action taking place in step 11 is desirable in that it releases additional juice, thus increasing the yield, and it tends to produce a better flavored final product, with better body. Likewise it appears to aid in obtaining the desired separation after freezing, with a minimum loss of sugar.

Freezing in step 14 can be preceded by cooling the juice to a temperature of the order of 32° F., after which it is applied as a thin layer to a refrigerated metal surface. Conventional ice machines of the type in which liquid is applied as a thin layer to a refrigerated surface, and then removed by scrapers, can be employed. Preferably an endless metal belt is employed, which moves at a predetermined speed, and is subjected to refrigeration as by enclosing it in a refrigerated tunnel. The liquid is applied (as by dripping or spraying) as a thin film on the belt, and the ice crystals are removed by suitable scraping means or blades. As previously stated, it is important for this operation to be carried out in such a manner that the resulting crystals are aged, thus avoiding production of microscopic or impalpable crystals which cannot be removed by centrifuging. Thus freezing should not be too rapid. In practice the material can remain on a refrigerated surface (at about 0° F.) for a period of about 3 to 5 minutes. Freezing in the manner just described not only produces crystals which can be separated by centrifuging, but also crystals having a maximum amount of entrained solids, skin fragments etc. from the liquid faction. In aging, there is a growth of the crystals from various centers, forming a filter bed of interlocking needle-like crystals similar to snow flakes.

The centrifuging operation 17 can be carried out by the use of centrifuges of the basket type, or I can employ so-called continuous centrifuges, such as the one manufactured and sold by Merco Centrifugal Co. under the trade-name of Mercone. This equipment employs a rotor carrying a conical-shaped screen, nested within a cone-shaped body, and surrounding an inner conical shaped body provided with a helicoidal rib. Material fed into the upper smaller end of the screen, travels downwardly, with progressive discharge of liquid through the screen, and with progressive discharge of separated solids from the bottom of the screen. Centrifugal apparatus of this type is desirable in that it permits continuous centrifuging operations, as distinguished from the batch operation of a basket type centrifuge.

My method can be applied to juices derived from a wide variety of fruits. For example, I have applied it successfully to such fruits as pears, apples, prune plums, grapes, watermelon, cherries, citrus fruit and the like. Also it can be applied to juices derived from various vegetables, such as carrots.

A particular example of the method is as follows.

Raw whole apples were supplied to a Rietz disintegrator of the type previously described, the disintegrator being provided with a screen having a 3/16 inch opening. Small amounts of pectinol were added as an enzyme. The resulting pulp was stored for a period of 8 hours, after which it was passed through a desludging centrifuge, to remove from 50% to 60% of the solids. These solids were pressed and the recovered juice merged with the juice from the desludging centrifuge. The juice was then chilled to 32° F., and applied as a thin film to a moving metal belt. The belt was refrigerated to 0° F., and the material was applied to the belt to produce a layer of approximately 1/8 inch thickness. The semifrozen material on the belt was permitted to remain thereon for a period of 3 minutes, after which it was removed by a scraper. The resulting semifrozen viscous slurry was supplied continuously to a centrifuge of the Mercone type, operated to discharge the ice crystals in a snowlike overflow. As a result of the first centrifuging, substantially 50% of the water content of the juice was removed. The freezing and centrifuging operations were repeated, whereby the water content of the No. 1 concentrate was reduced by 50%. Thus the No. 2 concentrate contained only 25% of its original water content. This concentrate had a flavor and freshness almost identical with that of the original raw apples. It was preserved for a substantial period of time at ordinary refrigerating temperatures, and was preserved indefinitely by freezing.

It will be evident from the foregoing that I have provided a method capable of producing a high quality juice concentrate. Since the method does not impair the flavor and freshness of the juice, it can be used on a wide variety of fruits and related products which have not previously been used for this purpose. In this connection, reference can be made to such products as apples, pears, prune plums, watermelon, and the like, which are subject to rapid deterioration, and which when treated by conventional processes produce concentrates which are of poor quality and of no commercial value. Although particularly applicable to such fruits, it will be evident that the method can be applied to produce the more common juice concentrates such as the various citrus juices, vegetable juice, and like materials of vegetable origin. Where citrus fruit is used, it is desirable to remove the skin of the fruit before disintegration. Treatment with an enzyme may be omitted, particularly where the use of the same is not beneficial.

I claim:

In a method for the manufacture of juice from fresh material of a vegetable origin, the steps of extracting juice from the fresh material, chilling the juice below freezing to form a semi-frozen material containing ice crystals in a liquid fraction, said last step being carried out by applying the juice as a thin layer having a thickness of the order of 1/8 inch to a refrigerated surface followed by the removal of the layer in semi-frozen form, the material being on the refrigerated surface for a predetermined time period of the order of 3 to 5 minutes to develop ice crystals favorable for subsequent treatment, and then immediately subjecting the removed semi-frozen material to centrifuging to remove the ice crystals from the remaining concentrate.

References Cited in the file of this patent

UNITED STATES PATENTS

| | | |
|---|---|---|
| 2,436,218 | Malcolm | Feb. 17, 1948 |
| 2,736,655 | Gordon et al. | Feb. 28, 1956 |
| 2,887,851 | Toulmin | May 26, 1959 |